US008070571B2

(12) United States Patent
Argentar

(10) Patent No.: US 8,070,571 B2
(45) Date of Patent: Dec. 6, 2011

(54) VIDEO GAME CONTROLLER

(76) Inventor: Eric Argentar, Brooklyn, NY (US)

(*) Notice: Subject to any disclaimer, the term of this patent is extended or adjusted under 35 U.S.C. 154(b) by 548 days.

(21) Appl. No.: 12/303,113

(22) PCT Filed: Jun. 4, 2007

(86) PCT No.: PCT/US2007/070369
§ 371 (c)(1),
(2), (4) Date: Dec. 1, 2008

(87) PCT Pub. No.: WO2007/143632
PCT Pub. Date: Dec. 13, 2007

(65) Prior Publication Data
US 2009/0181737 A1 Jul. 16, 2009

(51) Int. Cl.
A63F 13/00 (2006.01)
(52) U.S. Cl. .......... 463/2; 463/36; 463/37; 463/46; 345/156; 345/158; 345/163; 434/16
(58) Field of Classification Search .......... None
See application file for complete search history.

(56) References Cited

U.S. PATENT DOCUMENTS

| 5,213,335 | A  | * | 5/1993  | Dote et al. ............... 463/51 |
| 6,128,006 | A  | * | 10/2000 | Rosenberg et al. ...... 345/163 |
| 6,206,783 | B1 | * | 3/2001  | Yamamoto et al. ...... 463/36 |
| 6,280,327 | B1 | * | 8/2001  | Leifer et al. ............. 463/39 |
| 6,545,661 | B1 | * | 4/2003  | Goschy et al. ........... 345/158 |
| 6,569,019 | B2 | * | 5/2003  | Cochran .................... 463/37 |
| 6,672,962 | B1 | * | 1/2004  | Ozaki et al. .............. 463/37 |
| 6,902,482 | B1 | * | 6/2005  | Woolston .................. 463/37 |
| 6,902,483 | B2 | * | 6/2005  | Lin ........................... 463/37 |
| 6,908,386 | B2 | * | 6/2005  | Suzuki et al. ............. 463/30 |
| 6,931,775 | B2 | * | 8/2005  | Burnett ...................... 42/72 |
| 7,145,551 | B1 | * | 12/2006 | Bathiche et al. .......... 345/158 |
| 7,510,477 | B2 | * | 3/2009  | Argentar .................. 463/36 |
| 7,627,632 | B2 | * | 12/2009 | Douceur et al. ........... 709/205 |
| 7,736,230 | B2 | * | 6/2010  | Argentar .................. 463/36 |
| 2001/0028516 | A1 | * | 10/2001 | Noguchi ................... 359/823 |
| 2002/0010021 | A1 | * | 1/2002  | McCauley ................. 463/37 |
| 2002/0171625 | A1 | * | 11/2002 | Rothchild ................. 345/156 |
| 2003/0195041 | A1 | * | 10/2003 | McCauley ................. 463/37 |
| 2003/0199317 | A1 | * | 10/2003 | McCauley ................. 463/37 |
| 2005/0130739 | A1 | * | 6/2005  | Argentar .................. 463/36 |
| 2007/0021210 | A1 | * | 1/2007  | Tachibana ................. 463/37 |
| 2007/0167232 | A1 | * | 7/2007  | Argentar .................. 463/36 |

(Continued)

OTHER PUBLICATIONS

Web page at URL: http://cube.ign.com/articles/097/097671p1.html.*

(Continued)

Primary Examiner — David Graybill

(57) ABSTRACT

Improvements relating to a control device for controlling a display of a computer system for use with a video game includes a coordinate control unit for providing information related to a vertical and horizontal tilt of the control device, a game control unit for inputting game control information and a controller for processing the information provided by the coordinate control unit and game control unit. The vertical and horizontal point of view of the user in the video game and/or the vertical and horizontal position of a cursor on the display is determined based on the information related to the vertical and horizontal tilt of the control device. The control device is preferably shaped like a firearm to enhance the realism of the video game, and may include an LCD display mounted on the control device, as the primary display, and may also include an LCD mounted in a sighting device of the control device.

20 Claims, 9 Drawing Sheets

LCD attached to the body of the controller

U.S. PATENT DOCUMENTS

2009/0181737 A1* 7/2009 Argentar .................... 463/2
2009/0197679 A1* 8/2009 Argentar .................... 463/36

OTHER PUBLICATIONS

Web page at URL: http://www.geocities.com/mellott134/VRGun/VRGunblock.jpg.*

Web Page at URL: http//www.geocities.com/mellott124/vrSystems.htm?200531.*

Web Page at URL: http:/www.cwonline.com/store/view_product.asp?Product=1225.*

Web page at URL: http//www.klov.com/game_detail.php?game_id=13655.*

"Custom VR Systems" http://web.archive.org/web/0030213062555/http://www.vrimmersions.com/systems.htm posted on Feb. 13, 2003 retrieved on May 23, 2007.*

"Heckler and Koch MP5", http://en.wikipedia.org/wiki/Heckler_&_Koch_MP5, retrieved on May 24, 2007.*

Document entiled "Index of /mellot124/VRGun" located at URL: http://www.geocities.com/mellot124/VRGun/.*

Web Page at URL:http://www.monstergecko.com/products/html.*

* cited by examiner

VIDEO GAME CONTROLLER

FIELD OF THE INVENTION

The present invention relates generally to a control device particularly well suited for use by a player of a "first person shooter" type of video game.

BACKGROUND OF THE INVENTION

As computers have become a part of every day life, video games playable on computers have similarly become a very popular means of entertainment. While software and computer graphics innovations have made video games very realistic, most video games rely on more contemporary input devices such as a keyboard, computer mouse or joystick to allow a player to interact with the video game. While these traditional input devices are familiar to most users and easy to operate, they tend to take away from the realism of the video game.

My prior PCT application PCT/US04/41396 filed Dec. 9, 2004, and published as WO/2005/058434 and incorporated herein by reference, discloses an improved game controller.

The present application discloses further improvements to a controller of the type known by my prior PCT application, which improvements add to the realism of the environment being controller by the controller, such as a video game.

DETAILED DESCRIPTION OF THE INVENTION

The present invention relates to a control device particularly well suited for use by a player of a "first person shooter" type of video game. In such video games, the player typically is presented with a first person view of an environment in the video game and is asked to aim at and shoot various targets. The user is commonly provided with a fixed point of view, typically, in the center of the display. The point of view of the user in the game typically moves left, right, up, down, etc. based on the input from the computer mouse, keyboard, etc. to allow the user to aim at various targets in the video game. Targeting or aiming is typically accomplished by positioning the center of the fixed point of view at the desired position, generally using the computer mouse or keyboard or gamepad controls to change the point of view of the user in the video game. Shooting the target is typically accomplished by pressing a dedicated shoot button. The dedicated shoot button is typically one of the mouse buttons or a key on the keyboard or gamepad. Similarly, joysticks may also be used to change the point of view of the user in the game, and shooting is typically accomplished by pressing a shoot button, generally located on the top of the joystick or on a base of the joystick.

The control device of the present invention can quickly change the point of view of the user by simply moving the control device provides more intuitive and realistic interaction with the video game.

While the control device of the present invention is particularly well suited for use in such video games, the control device is preferably operable with any video game and may be used as a mouse-type device in conventional computer applications as well.

In addition, the control device of the present invention is preferably compatible with video game systems such as the SONY PLAYSTATION®, a registered trademark of Sony Computer Entertainment Inc. Similarly, the control device may be utilized with other computer simulations and virtual reality systems such as those commonly used by law enforcement and military agencies as training aids.

More specifically, a control device according of the present invention is described with reference to FIGS. 1, 2 and 3, which illustrate a block diagram and first and second embodiments of a particular form/shape for a control device as shown in my prior PCT application PCT/US04/41396, which establish an environment useful for carrying out the improvements of the present invention, which are described in FIGS. 4-9

Figure 1:
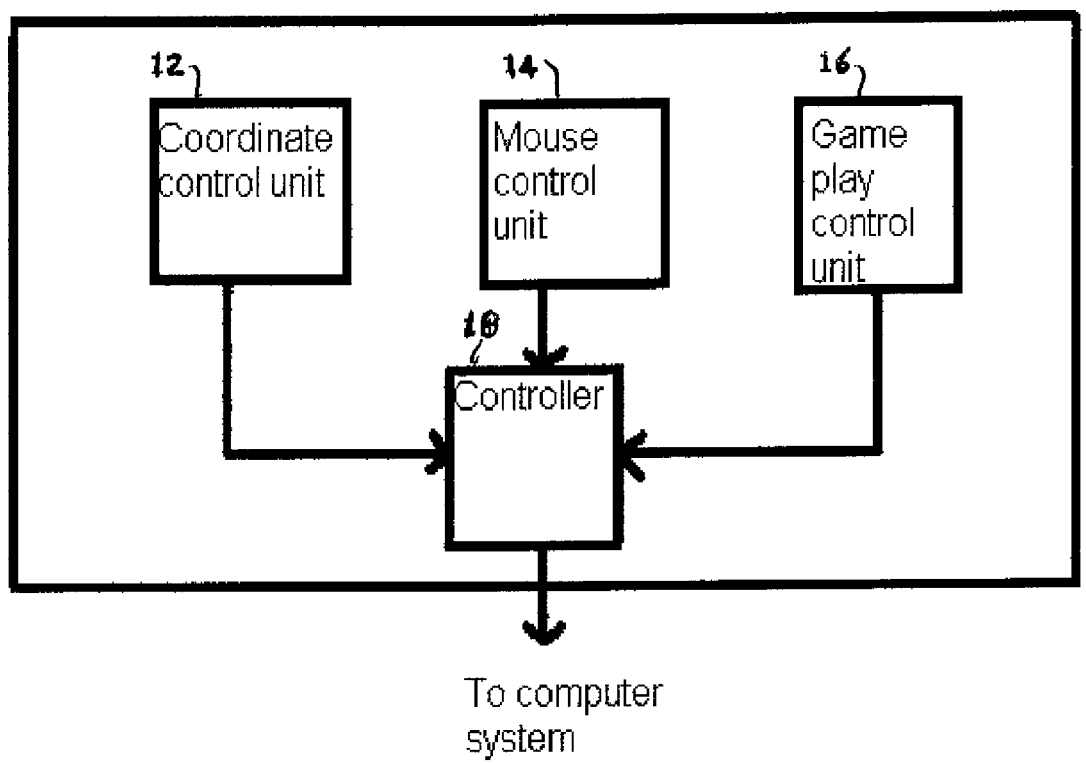
FIGS. 1, 2 and 3 illustrate a block diagram and first and second embodiments of a particular form/shape for a control device as shown in my prior PCT application PCT/US04/41396, which establish an environment useful for carrying out the improvements of the present invention.

Referring first to FIG. 1, a coordinate control unit 12 is used to input information regarding the desired horizontal and vertical point of view of the user in the video game. More specifically, the coordinate control unit 12 may be used to provide information related to pitch, the vertical tilt, and yaw, the horizontal tilt, of the control device to indicate the desired horizontal and vertical point of view of the display of the computer system. A mouse-type control unit 14 provides traditional computer mouse button input information, such as to mimic left and right mouse keys. A game play control unit 16 provides additional conventional game play input information. Controller 18 receives information from the coordinate control unit 12, mouse control unit 14 and game play control unit 16 and provides game play information to the computer system. In this manner, the control device of the present application includes substantially all of the functionality required to play today's advanced video games.

Figure 2:
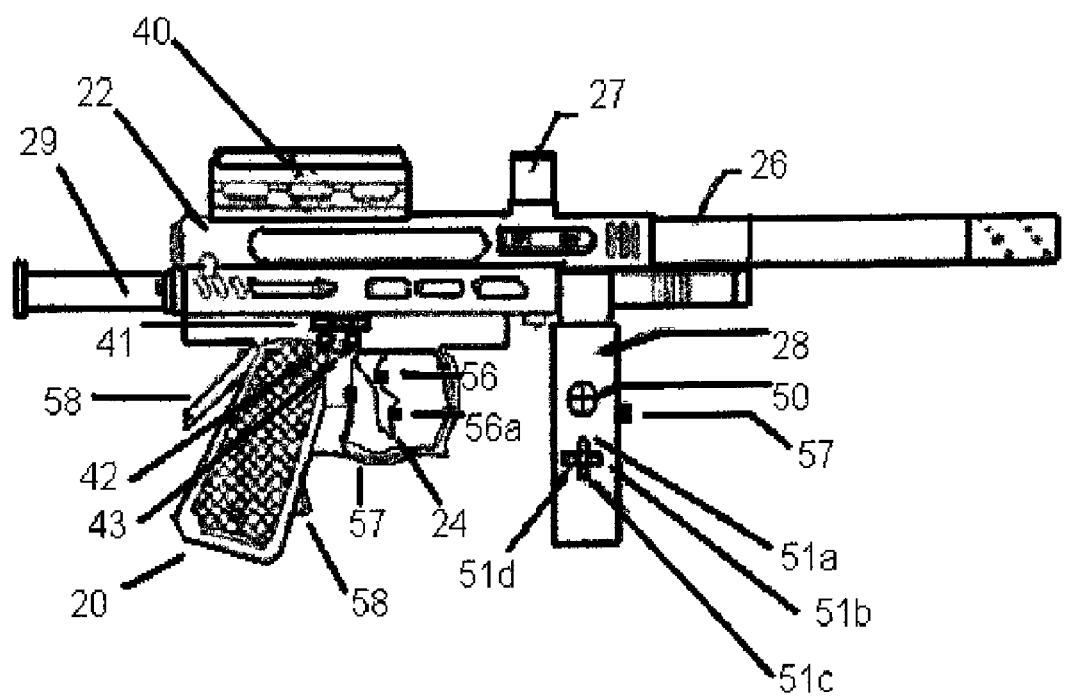

As disclosed in my above-noted PCT application PCT/US04/41396, the control device is preferably shaped as a firearm, which preferred shape is described further with reference to FIG. 2. As shown therein, the control device includes a hand grip 20 positioned below a rear section of a central body 22. A trigger 24 extends down from the central body 22 in front of the hand grip 20. A barrel 26 extends forward from the central body 22. An adjustable fore grip 28 may extend downward from the barrel 26 in front of the trigger. For increased reality, the control device may include a removable stock 29, which can be used to steady the control device 10 against the user's shoulder. This will increase stability of the control device. The control device may also be configured as a pistol, another firearm, a pointer or the like.

While a firearm is the desired shape of the control device, other shapes may be used, and the invention is not limited to that shape.

The game play control unit 16 preferably includes game play controls and is illustrated in FIG. 1. Game play controls include controls for inputting information related to other aspects of the video game, for example, character movement in space in the video game, also referred to as longitudinal and lateral movement. Referring again to FIGS. 2 & 3, hat switch 50 and/or a directional switch 51 are preferably used to control the lateral and longitudinal movement of a character in the game. While the hat switch 50 and the directional switch 51 may both be used to control lateral movement, they function in a slightly different manner. The hat switch 50 typically includes four momentary contact switches with a pad mounted over them. Each momentary contact switch is activated when the user presses down on the section of the pad that is over the respective momentary contact switch. Typically, only one momentary contact switch may be activated at a time, that is, input from more than one momentary contact switch is generally ignored. The directional switch 51, however, typically allows input regarding motion in two directions at the same time. The direction switch 51 preferably includes four independent contact switches 51a, 51b, 51c, 51d, generally in a diamond shaped configuration. Each of the independent contact switches 51a, 51b, 51c, 51d typically is used to provide for movement in a particular direction in the video game. Unlike the hat switch 50, users are generally able to activate more than one of the contact switches at the same time. More specifically, most video games will allow for movement in the right and forward direction at the same time, for example. The result is diagonal movement in the video game. For example, conventional video games will allow such movement when the keyboard is used as the control device. The independent contact switches 51a, 51b, 51c, 51d of the directional switch 51 may mimic such control from the keyboard. This allows a user of the video game to move the character forward, backward, left, right and diagonally in space in the video game environment. In addition, where the user uses the hat switch 50 for longitudinal and lateral movement in the vide game, for example, the direction switch 51 may be used for other functions which increases the flexibility of the control device. Alternatively, where the direction switch 51 is used longitudinal and lateral movement in the video game, for example, the hat switch 50 may be used for other functions.

In addition, game play controls may include a jump button 52, a run button 53, a crouch button 54 and a special action button 55. These game play controls may be positioned on a side surface of the hand grip 20 of the control device such that they are easily operated by the thumb of the user as it wraps around the hand grip (See FIG. 3). Shoot buttons 56 and 56a may also be considered a game play control. Naturally, different games may have different game play options, and thus, it is impossible to list all possible game play controls, however, the control device of the present application is intended to be compatible with most every video game.

The coordinate control unit 12 of FIG. 1 may be implemented using a gyroscope 40 (see FIG. 3) or other motion sensing devices. The gyroscope 40, may be mounted on or in the control device. A solid state gyroscope may be utilized to determine the pitch and yaw of the control device 10 in the present application.

Figure 3:
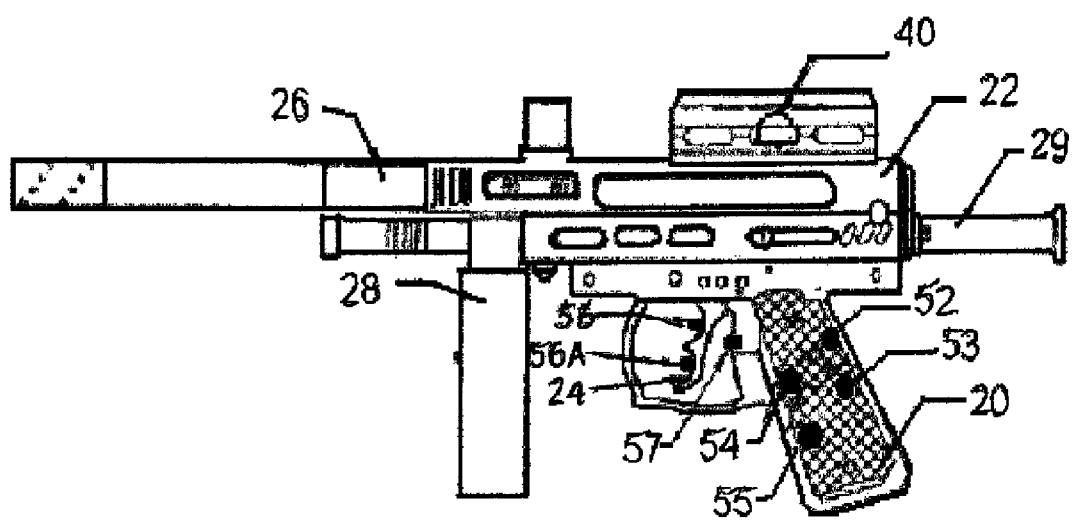

A coordinate activation button 57, shown in FIG. 3, is preferably included in the game play control unit 16. The activation button 57 activates the input of information from the coordinate control unit 12 while depressed. That is, ordinarily the information from the coordinate control unit is not used to control the display of the computer system. In this manner, inadvertent jostling or movement of the control device 10 by the user is not used to alter the point of view of the user in the video. The user depresses the activation button 57 when they wish to change the point of view. Generally, this operation is intuitive to the user in that the user depresses a button when he or she desires to change the display of the computer system and otherwise inadvertent movements do not affect the display of the computer screen. In this manner, a user can reposition the control device for comfort without changing the point of view of the user in the computer game. Alternatively, the activation button 57 may be used as a kill button, that is, the information from the coordinate control unit 12 is utilized to control the display normally, unless the kill button is depressed. This is slightly less intuitive for a user, however, it sill provides a way for the user to adjust his or her position or grip without affecting the display of the computer system when necessary. In addition, the activation button 57 may be a lever type switch positioned on the rear or front of the hand grip 20.

In the present embodiment a lever type button 58 as shown in FIG. 2, may be included to provide input when pressure is applied. The lever type button 58 may be positioned on the rear of the hand grip 20 such that it can be easily activated by the hand of the user gripping the hand grip. The lever type button may also be positioned on a front side of the hand grip 20 on the lower portion below the trigger 24. The lever type button 58 is preferably utilized as the coordinate activation button 57. In this case, as shown in FIG. 2, the button 57 described above may be used to control another function.

In accordance with a first improvement to a controller of the type noted above, an LCD mounted to the body of the controller, for use as a primary display of the video game.

Figure 4:
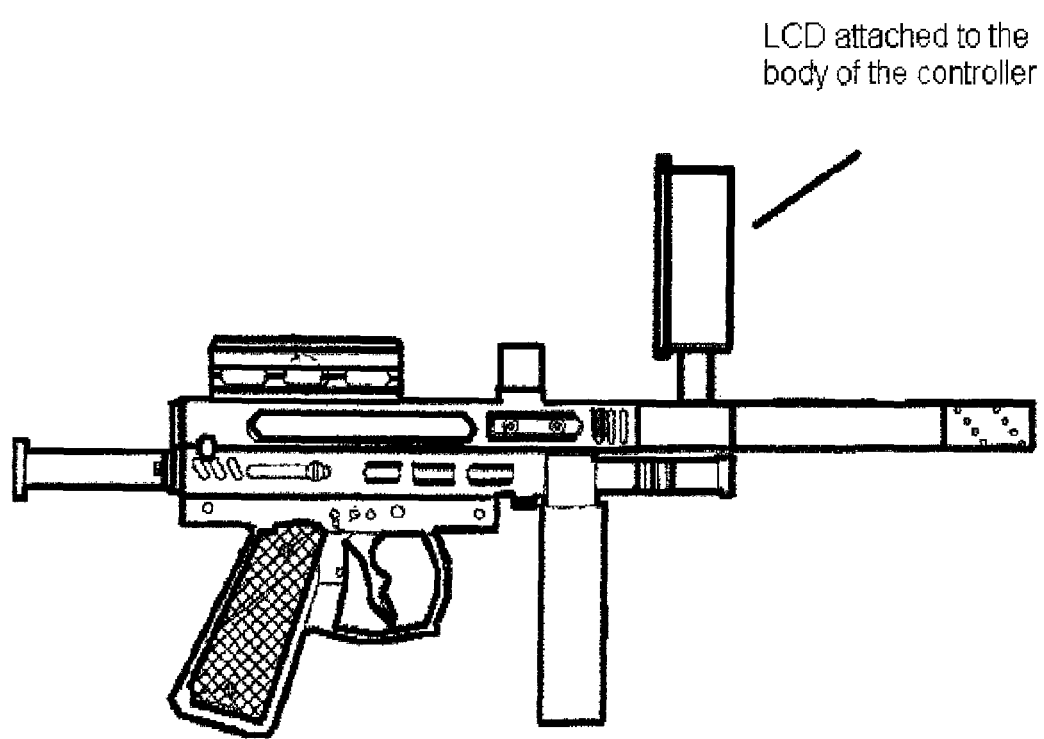
FIG. 4 illustrates one embodiment of a display related improvement for a controller of the type shown by FIGS. 1-3.

As shown in more detail in FIG. 4, video data is supplied from the pc or video game console to the LCD mounted to the controller, such that no other monitor is required, whether pc or television screen. The LCD is placed such that the user can easily see the face of the screen when the gun is held in a shooting position. Being that the motion sensor in the controller detects tilt and rotation of the device, and that this movement is used by the video game to determine point of view in the game environment, the resulting affect is that as the player repositions the controller and the viewpoint as the game changes accordingly. Thus, the player gets the impression of aiming the controller at the game images displayed on the LCD, such as one would normally sense when they aim a firearm. This embodiment could be correlated to such precision that rotating the controller a given degree would cause a change of viewpoint to the same degree, to the extent that if in the game world, a target is, for example, 20 degrees to the player's left, the player would then need to rotate the controller 20 degrees to the left in order to bring the target into the center of the player's view point. The amount of correlation between real world and game environment could be adjustable. The LCD could be used with multiple conventionally displays, or projected images, or other LCDs mounted on the device.

In accordance with a second improvement to a controller of the type noted above, an LCD embedded within the sighting scope of the controller, is used for supplying additional visual data for game play.

Figure 5:
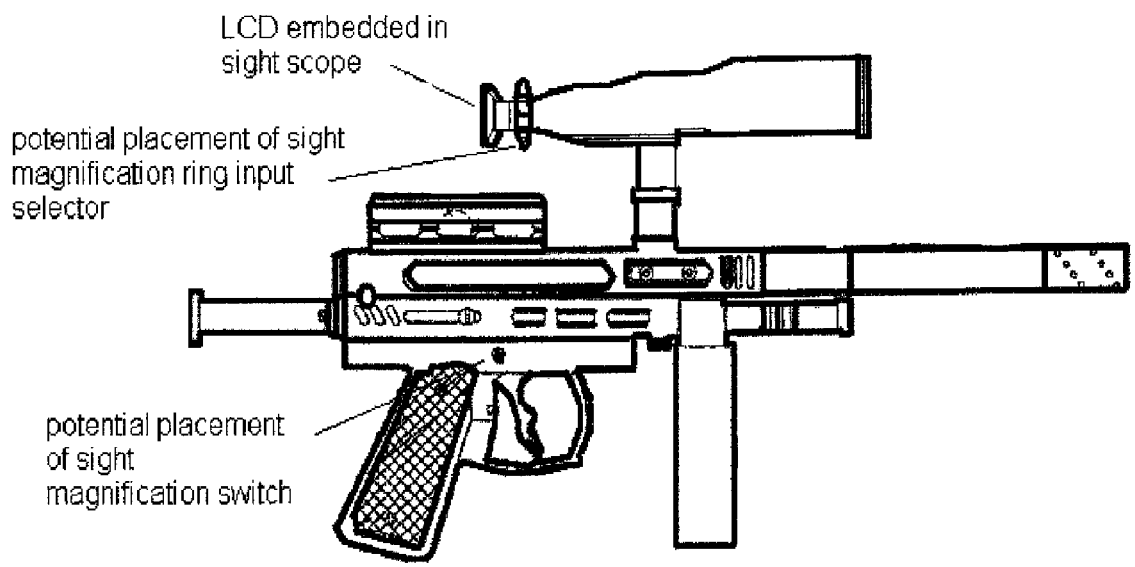
FIG. 5 illustrates one embodiment of a further display related improvement for a controller of the type shown by FIGS. 1-3.

As shown in FIG. 5, a small LCD screen is affixed into a sighting scope mounted on the controller, in such a manner that when the scope is held up to eye level and the player looks into the scope, the player is presented with a game image generated from video input from a pc or game console. This image could be a magnified image which has the same point of view normally produced by the game, thereby mimicking the function of a firearm's telescopic sight, or it could be other visual data beneficial to game play. Additional switches could be mounted to the body of the controller, for manipulating the amount of magnification desired. The LCD sight could be used together with conventionally displays, or other projected images, or other LCDs mounted on the device.

In accordance with a third improvement to a controller of the type noted above, a video projector is mounted to the controller, for use as the primary display generating component of the video game.

Figure 6:
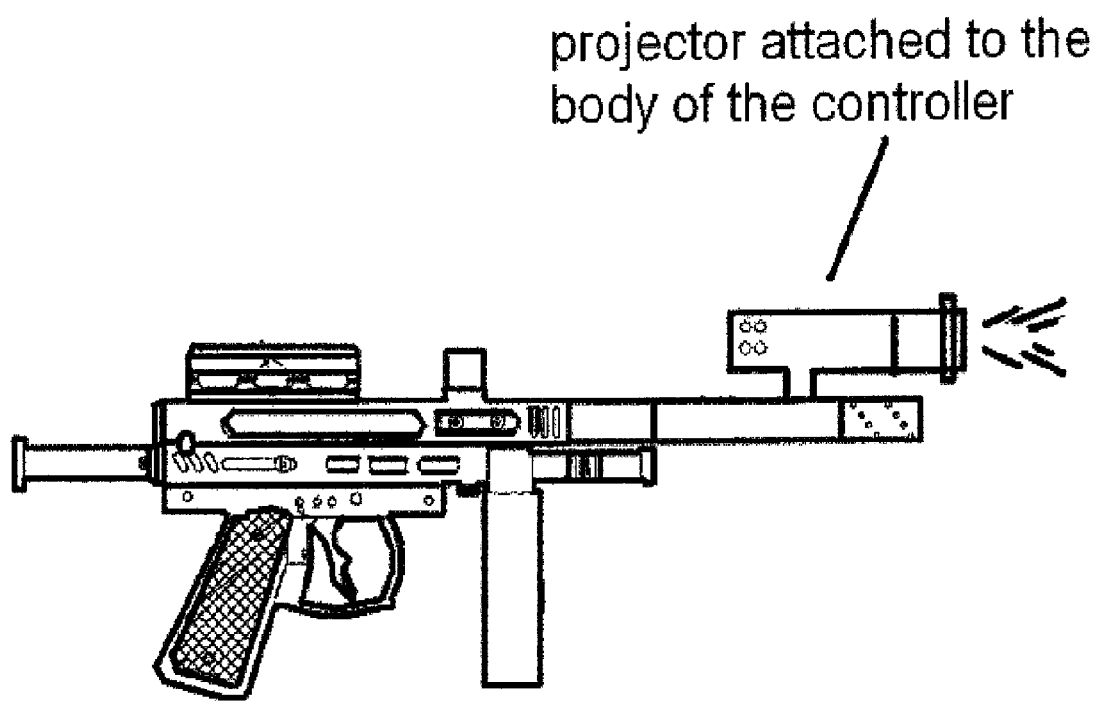
FIG. 6 illustrates one embodiment of an even further display related improvement, e.g; use of a projector display, for a controller of the type shown by FIGS. 1-3.

As shown in FIG. 6, video data is supplied from the pc or video game console to the projector mounted to the controller, such that no other monitor is required, whether pc or television screen. The projector is placed such that the user can easily see the projected image when the gun is held in a shooting position. Being that the motion sensor in the controller detects tilt and rotation of the device, and that this movement is used by the video game to determine point of view in the game environment, the resulting affect is that as the player repositions the controller, and the viewpoint in the game changes accordingly, the player gets the impression of aiming the controller at the projected game images, such as one would normally aim a firearm. This could be correlated to such precision that rotating the controller a given degree would cause a change of viewpoint to the same degree, to the extent that if in the game world, a target is, for example, 20 degrees to the player's left, the player would then need to rotate the controller 20 degrees to the left in order to bring the target into the center of the player's view point. The amount of correlation between real world and game environment could be adjustable. The projector could be used with multiple conventionally displays, or other projected images, or other lcds mounted on the device.

In accordance with a forth improvement to a controller of the type noted above, a curved screen is provided upon which the projected image from improvement three is projected.

Figure 7:
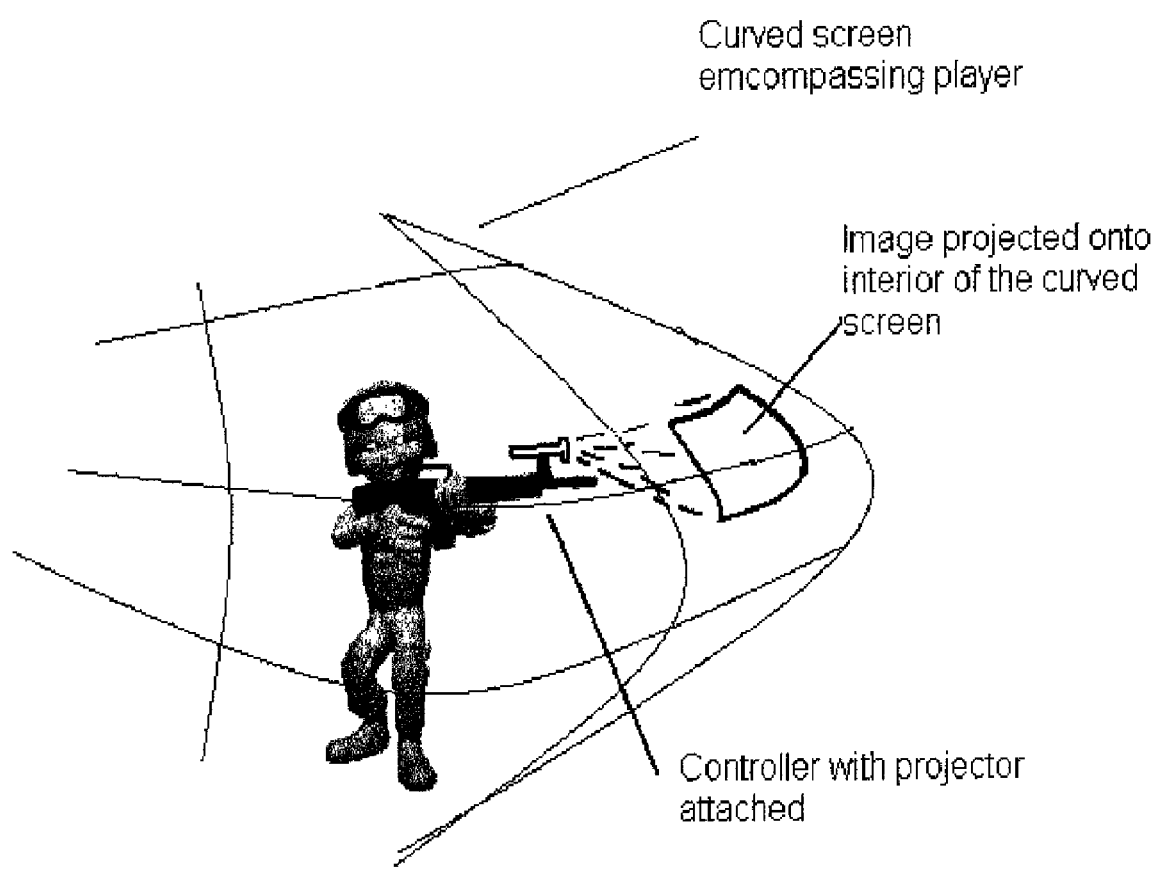
FIG. 7 illustrates one embodiment of an even further display related improvement, e.g; use of a curved screen for receiving the projector display from a controller of the type shown by FIG. 6.

As shown in FIG. 7, a curved screen is provided which could partially or fully encompass the game player (to be used in conjunction with a projector mounted on the controller). The curvature would allow the projected image to be displayed anywhere the player aims the controller, the result being that as the player changes the position (tilt and rotation) of the controller, and the projected point of view changes accordingly, the projected game environment will take on the appearance of surrounding the player. The size of the screen could vary, as the distance of the player (at the center of the screen curvature or sphere) from the screen will dictate the size of the projected image.

In accordance with a fifth improvement to a controller of the type noted above, a knee pad mounted switch is provided, which would require the user to place a knee on the ground in order to activate a similar in-game action.

Figure 8:
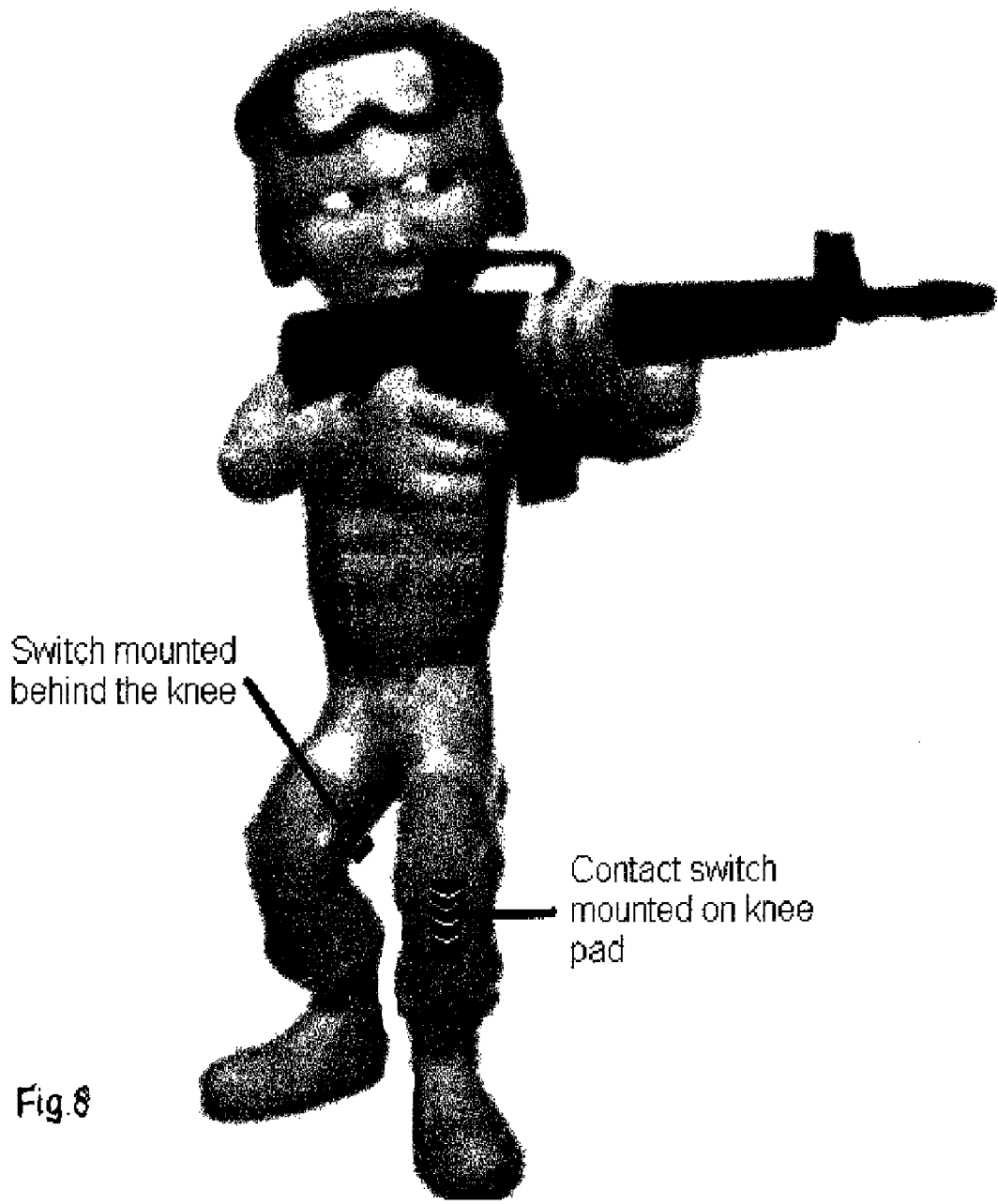
FIG. 8 illustrates one embodiment of a control switch related improvement for a controller of the type shown by FIGS. 1-3.

As shown in FIG. 8, a knee pad mounted switch, in which a player would have to have the switch make contact with the floor in order to activate the in-game action of crouching.

Conversely, the switch could be behind the player's knee, and bending of the knee could trigger the same game action. Behind the knee based bending could result in an in-game result of incremental crouching, while the knee pad based switch would be in an either on or off state as the player's knee either touches or removes from the floor. The desire to crouch is a function of the realism of the game environment, as crouching in conjunction with manipulating the tilt and rotation of the controller allows for better control of the view point, which translates to better aiming in the game environment.

In accordance with a sixth improvement to a controller of the type noted above, a realistic reloading and chambering of rounds/ammunition from the controller is provided.

Figure 9:
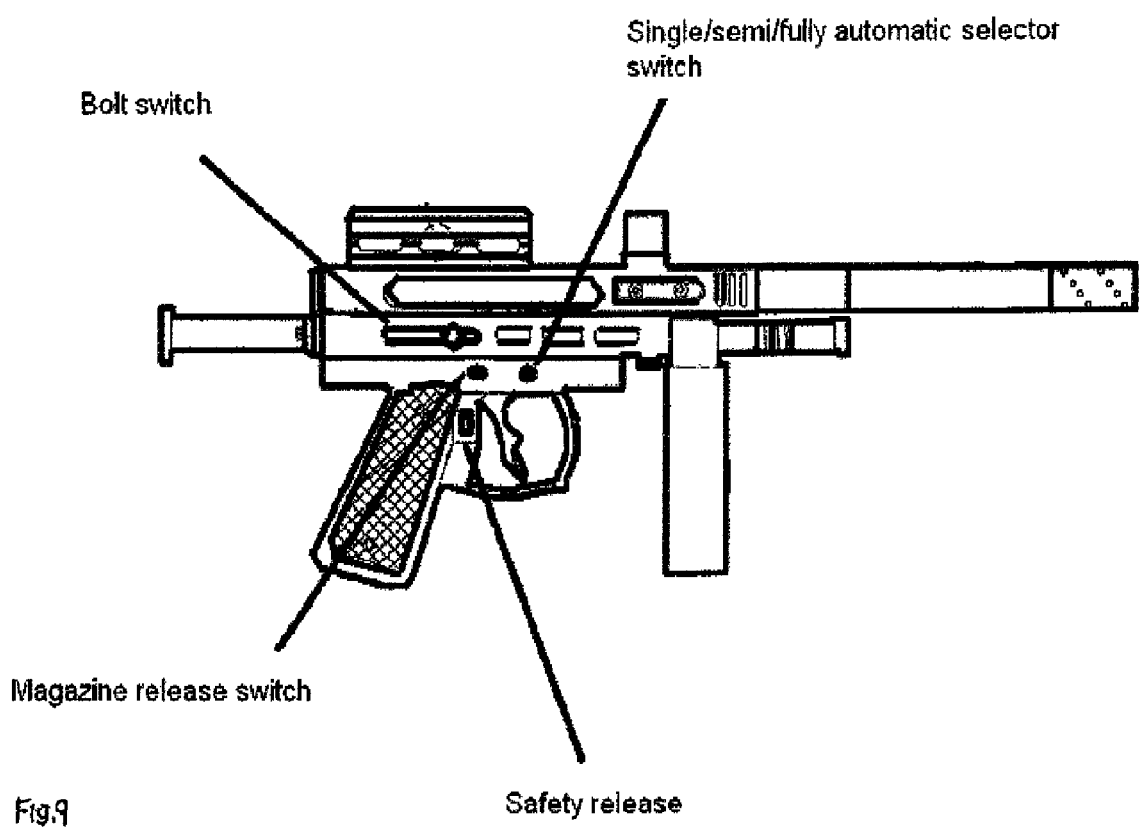
FIG. 9 illustrates one embodiment of a further display related improvement for a controller of the type shown by FIGS. 1-3.

As shown in FIG. 9, a realistic reloading mechanism with corresponding input into the video game or simulation could be mounted on or in the controller. For instance, a sensor detecting a sliding chamber, a revolver's loading mechanism, clip removal and reloading, hammer cocking, safety release, pump action for a shot gun, and similar reloading and calibration including automatic/semi-automatic selection of the weapon could be reproduced by a plurality of switches on or in the controller, which their associated actions taking place in the game or simulation. For example, pressing a switch would release a magazine clip from the controller, while at the same time sending that information to the video console, indicating that the player is reloading. When a new magazine is placed in the controller, a switch would be trigger, sending that information to the video console that the player's weapon has been reloaded. Similarly, a bolt mechanism might have to been reset by the player, with an integrated switch detecting this action, which would send input that a round has been chambered. The controller could have to be reloaded in the proper sequence to allow the user to successfully use the weapon in the virtual environment. This would have benefits for use of the controller in gun safety or military simulations, as shown in FIG. 7.

The invention claimed is:

1. A control device for operation by a user for controlling a display of a computer system for use with a video game, comprising:
    a coordinate control unit adapted to be handled by the user in order to generate input information related to a vertical and a horizontal tilt of the control device;
    a game play control unit adapted to be handled by the user in order to generate game play input information; and
    a controller adapted to process said input information from the coordinate control unit to provide point of view information of an avatar of the user in the video game to the computer system, and adapted to process said input information from the game play control unit in order to provide game information representative of at least positional movement of the avatar of the user in the video game to a display of the computer system, wherein
    the control device has a shape substantially similar to a firearm, and
    a primary display of the computer system is provided by a display which is mounted on said firearm shaped control device.

2. The control device of claim 1, wherein said control device has a shape comprising:
    a central body,
    a handgrip extending downward from a rear section of the central body; and
    a barrel extending longitudinally forward from the central body, and said primary display is mounted on said barrel.

3. The control device of claim 2, wherein said primary display comprises an LCD display mounted on said barrel in alignment with a sighting portion of said firearm control device.

4. The control device of claim 1, including a sighting device mounted on said control device, said sighting device including an electronic display therein which displays to the user a magnified image of a portion of an image which is currently being displayed on said primary display, said magnified image being representative of the current aim of the control device with respect to the primary image.

5. A control device for operation by a user for controlling a display of a computer system for use with a video game, comprising:
a coordinate control unit adapted to be handled by the user in order to generate input information related to a vertical and a horizontal tilt of the control device;
a game play control unit adapted to be handled by the user in order to generate game play input information; and
a controller adapted to process said input information from the coordinate control unit to provide point of view information of an avatar of the user in the video game to the computer system, and adapted to process said input information from the game play control unit in order to provide game information representative of at least positional movement of the avatar of the user in the video game to a display of the computer system, wherein
the control device has a shape substantially similar to a firearm, and
a primary display of the computer system is provided by a video projector which is mounted on said firearm shaped control device, for projecting images representative of at least said positional movement of the avatar of the user in the video game.

6. The control device of claim 5, wherein said control device has a shape comprising:
a central body,
a handgrip extending downward from a rear section of the central body; and
a barrel extending longitudinally forward from the central body, and said primary display is mounted on said barrel.

7. The control device of claim 6, wherein said primary display comprises an video projector mounted on said barrel.

8. The control device of claim 5, further including a curved display screen for at least partially enclosing said user, upon which said projector projects said images.

9. The control device of claim 6, wherein the coordinate control unit further comprises:
a y-axis sensor adapted to input information regarding a tilt of the barrel of the control device in a vertical direction; and
an x-axis sensor adapted to input information regarding a tilt of the barrel of the control device in a horizontal direction.

10. The control device of claim 9, wherein the y-axis sensor further comprises:
a horizontal shaft attached to a side of the barrel that rotates as the barrel is tilted upward and downward;
a first optical disk attached to the horizontal shaft such that the optical disk rotates with the horizontal shaft; and
at least one optical encoder adapted to correlate rotation of the optical disk to vertical tilt of the barrel to provide information indicating a desired vertical point of view of the avatar of a user in the video game.

11. The control device of claim 1, wherein the coordinate control unit further comprises: at least one gyroscope adapted to provide input information regarding the vertical and horizontal tilt of the control device in order to provide information regarding a desired vertical and horizontal point of view of the avatar of the user in the video game.

12. The control device of claim 1, wherein the coordinate control unit further comprises: at least one gyroscope adapted to provide information regarding the vertical and horizontal tilt of the control device in order to provide information regarding a desired vertical and horizontal position of a cursor on the display of the computer system.

13. The control device of claim 1, further including a mouse button-type control unit adapted to be operated by the user in order to generate computer mouse button-type input information, wherein the mouse button-type control unit comprises:
a wheel adapted to provide information to scroll up or down on the display;
a left button adapted to provide information regarding selections of the user; and
a right button adapted to provide information regarding other selections of the user.

14. The control device of claim 2, further including:
a trigger extending downward from the central body in front of at least a portion of the handgrip.

15. The control device of claim 1, wherein the game play control unit comprises:
a directional controller adapted to generate input information regarding longitudinal and lateral movement in space;
a plurality of buttons adapted to provide information regarding a plurality of actions performed on the display, the plurality of actions including two or more of running, crouching, jumping and special actions; and
a coordinate activation button adapted to selectively enable and disable input of information from the coordinate control unit to the computer system.

16. The control device of claim 15, wherein the plurality of buttons are positioned on the handgrip of the control device such that the plurality of buttons are operable by fingers of the hand of the user gripping the handgrip.

17. A method for allowing a user to control a display of a computer system, comprising:
providing a display control unit with a shape substantially similar to a firearm, the display control unit comprising a central body, a handgrip extending downward from a rear section of the central body, and a foregrip or barrel extending longitudinally forward from the central body;
receiving information from a coordinate control unit portion of the display control unit that is related to a vertical and a horizontal tilt of the display control unit and is representative of point of view information of an avatar of the user in the video game;
receiving information from a game play control unit portion of the display control unit that is representative of at least positional movement of the avatar of the user in the video game; and
providing game information for controlling the display of the computer system based on information received from the coordinate control unit and providing game information for controlling the display of the computer system based on information received from the game play control unit, both of said providing being accomplished by use of a primary display which is mounted on said control device.

18. The method of claim 17, wherein:
the display control unit is adapted to be grasped by two hands of the user, where:
the fingers or thumb of one hand, positioned on one of the foregrip or barrel, operate one or more buttons adapted to provide input information regarding longitudinal and lateral movement of the avatar of the user on the display in space, while the fingers or thumb of the other hand, positioned on the handgrip, operate one or more buttons adapted to provide input information regarding a plurality of actions performed by the avatar of the user on the display, the plurality of actions including one or more of running, crouching, jumping and selecting weapons, wherein both hands, in addition to providing the above-noted operation, provide stability to the device with respect to the vertical and horizontal tilt of the unit, as well as reducing fatigue in wielding the unit in a manner similar to a real firearm.

19. The control device of claim 5, wherein the coordinate control unit further comprises: at least one gyroscope adapted to provide input information regarding the vertical and horizontal tilt of the control device in order to provide information regarding a desired vertical and horizontal point of view of the avatar of the user in the video game.

20. The control device of claim 5, wherein the game play control unit comprises:
    a directional controller adapted to generate input information regarding longitudinal and lateral movement in space;
    a plurality of buttons adapted to provide information regarding a plurality of actions performed on the display, the plurality of actions including two or more of running, crouching, jumping and special actions; and
    a coordinate activation button adapted to selectively enable and disable input of information from the coordinate control unit to the computer system.

\* \* \* \* \*